US012512905B2

(12) United States Patent
Lofquist

(10) Patent No.: US 12,512,905 B2
(45) Date of Patent: *Dec. 30, 2025

(54) BROADBAND SATELLITE TERMINAL

(71) Applicant: Blue Digs LLC, Wilmington, DE (US)

(72) Inventor: David Lofquist, Los Angeles, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 18/165,828

(22) Filed: Feb. 7, 2023

(65) Prior Publication Data

US 2023/0188201 A1    Jun. 15, 2023

Related U.S. Application Data

(63) Continuation of application No. 17/097,944, filed on Nov. 13, 2020, now Pat. No. 11,588,545, which is a continuation of application No. 15/672,187, filed on Aug. 8, 2017, now Pat. No. 10,840,998.

(60) Provisional application No. 62/523,063, filed on Jun. 21, 2017.

(51) Int. Cl.
*H04B 7/185* (2006.01)
*H04W 16/28* (2009.01)

(52) U.S. Cl.
CPC ..... *H04B 7/18515* (2013.01); *H04B 7/18513* (2013.01); *H04B 7/18517* (2013.01); *H04W 16/28* (2013.01)

(58) Field of Classification Search
CPC ............ H04B 7/18513; H04B 7/18515; H04B 7/18517; H04B 16/28
See application file for complete search history.

(56) References Cited

U.S. PATENT DOCUMENTS

| 6,226,493 | B1 | 5/2001 | Leopold et al. | |
|---|---|---|---|---|
| 6,609,013 | B1* | 8/2003 | Oh | H04W 52/42 455/562.1 |
| 7,457,641 | B1 | 11/2008 | Legnain et al. | |
| 8,873,484 | B1 | 10/2014 | Lee et al. | |
| 9,154,217 | B1 | 10/2015 | Jain et al. | |
| 10,320,188 | B2* | 6/2019 | Xu | H02M 3/158 |

(Continued)

FOREIGN PATENT DOCUMENTS

| CN | 102882584 A | 1/2013 |
|---|---|---|
| CN | 104427658 A | 3/2015 |

(Continued)

*Primary Examiner* — Brian P Cox

(57) ABSTRACT

A satellite system may have a constellation of communications satellites in orbits such as highly inclined eccentric geosynchronous orbits and low earth orbits. Satellite terminals may be used to communicate with the satellite constellation. The satellite terminals may have control circuitry that dynamically adjusts phased antenna array circuitry to steer antenna beams towards one or more satellites. Multiple antenna beams may be steered in different directions simultaneously. A satellite terminal may be used in simultaneously transmitting and receiving data from different respective satellites and may be used in transmitting and receiving satellite signals in multiple satellite bands. The satellite terminal may have an outdoor unit that is coupled to an indoor unit over a digital communications path. The outdoor unit may include the phased antenna array circuitry and transceiver and modem circuitry, whereas the indoor unit may cache media and serve as a firewall, router, and wireless access point.

20 Claims, 4 Drawing Sheets

(56) References Cited

U.S. PATENT DOCUMENTS

| | | | |
|---|---|---|---|
| 2006/0273967 A1 | 12/2006 | Gat et al. | |
| 2009/0009392 A1 | 1/2009 | Jacomb-Hood et al. | |
| 2009/0096857 A1 | 4/2009 | Frisco et al. | |
| 2009/0154391 A1 | 6/2009 | Wittenschlaeger | |
| 2010/0283661 A1 | 11/2010 | Strain et al. | |
| 2013/0070677 A1 | 3/2013 | Chang | |
| 2015/0011159 A1* | 1/2015 | Marinov | H01Q 3/08 455/12.1 |
| 2015/0365116 A1 | 12/2015 | Henderson et al. | |
| 2016/0093950 A1* | 3/2016 | Cummings | H01Q 3/04 342/359 |
| 2016/0219539 A1 | 7/2016 | Kim et al. | |
| 2017/0047986 A1* | 2/2017 | Petrovic | H04B 7/18513 |
| 2017/0256864 A1 | 9/2017 | Jensen et al. | |
| 2017/0317742 A1 | 11/2017 | Feria et al. | |
| 2018/0083357 A1 | 3/2018 | Nicolls et al. | |
| 2018/0287693 A1 | 10/2018 | Naseef | |
| 2019/0131722 A1* | 5/2019 | Ryu | H01Q 25/005 |

FOREIGN PATENT DOCUMENTS

| | | | | |
|---|---|---|---|---|
| CN | 105874723 A | | 8/2016 | |
| CN | 206099978 U | | 4/2017 | |
| GB | 2536651 A | * | 9/2016 | H04B 7/18517 |

* cited by examiner

BROADBAND SATELLITE TERMINAL

This application is a continuation of U.S. patent application Ser. No. 17/097,944, filed Nov. 13, 2020, which is a continuation of U.S. patent application Ser. No. 15/672,187, filed Aug. 8, 2017, which claims the benefit of provisional patent application No. 62/523,063, filed on Jun. 21, 2017, each of which is hereby incorporated by reference herein in its entirety.

FIELD

This disclosure relates generally to satellite communications, including to terminals for use in satellite systems.

BACKGROUND

Communications systems often use satellites to convey data. Satellite-based systems allow information to be conveyed wirelessly over large distances, such as oceans and continents. For example, satellite-based systems can be used to convey media information to a large number of receivers over a large area, such as broadcast satellite networks. Further, satellite communications systems can be used to provide coverage where physical infrastructure has not been installed and/or to mobile devices that do not remain attached to an infrastructure resource. For example, satellite communications systems can provide communications capabilities to land-based devices, such as handheld equipment and home or office equipment.

It can, however, be challenging to provide satellite access to large numbers of users. For example, the installation and maintenance of user terminal equipment can be overly complex and expensive, and/or can be unable to deliver desired levels of performance.

SUMMARY

A satellite system may have a constellation of communications satellites in one or more orbits, such as highly inclined eccentric geosynchronous orbits and low earth orbits. Satellite terminals may be used to communicate with the satellite constellation. The satellite terminals may have control circuitry that dynamically adjusts phased antenna array circuitry to steer antenna beams towards one or more satellites. Satellite transceiver circuitry and modem circuitry may be coupled to the phased antenna array circuitry to process and otherwise manage received and transmitted traffic.

Multiple antenna beams may be steered in different directions simultaneously, using multiple respective phased antenna arrays in the phased antenna array circuitry. Circuitry in the satellite terminal, such as phased antenna array circuitry, satellite transceiver circuitry, and modems may be used in simultaneously transmitting data to and receiving data from different respective satellites, and may be used in transmitting and receiving satellite signals in multiple satellite bands.

A satellite terminal may have an outdoor unit that is communicatively coupled to an indoor unit over a digital communications path, which can be wired or wireless. The outdoor and indoor units may have respective communications circuits that communicate over a communications path such as a cable or wireless connection between the outdoor and indoor units. Power may also be conveyed over the cable or wirelessly from the indoor unit to the outdoor unit.

The outdoor unit may include the phased antenna array circuitry and the satellite transceiver circuitry and modems. The indoor unit may include signal processing electronics, storage for media caching, and circuitry that allows the indoor unit to serve as a firewall, router, and/or wireless access point.

DETAILED DESCRIPTION

The present disclosure, including the accompanying drawings, is illustrated by way of examples and not by way of limitation.

A communications network may include one or more communications satellites and other equipment, including ground-based communications equipment and user terminals (or user equipment (UE)). One or more of the satellites may be used to deliver wireless services, e.g., to portable electronic devices, home and/or office equipment, and other equipment. For example, wireless services can be provided to handheld devices, wearable devices, set-top boxes, media devices, mobile terminals, computing devices, sensors, etc. In some configurations, services may be delivered to a user satellite terminal in a home or office that is linked by a wired or wireless communications link to further user equipment in the home or office such as a computer, set-top box, or television.

In some implementations, a satellite terminal can be configured to provide multiple services, including any of broadband data communications (e.g., internet access), voice communications, and media delivery (e.g., reception of video and/or audio broadcast). The satellite terminal can be configured to provide two or more services simultaneously, e.g., by communicating (receive and/or transmit) with two or more satellites. For example, the satellite terminal can be configured to communicate with two or more non-geostationary (NGSO) satellites that can be, e.g., in two or more different orbits at different orbital altitudes (e.g., low-Earth orbit and/or mid-Earth orbit). Further, the two or more satellites need not maintain a constant positional separation with respect to one another or to any absolute fixed-beam pointing direction. Additionally, the satellite terminal can communicate (receive and/or transmit) simultaneously with two or more different satellites using different frequency bands.

In some embodiments, two-way broadband communications service (e.g., internet access) can be provided over one communications band, such as V-band, while broadcast media can be received (and optionally locally cached) over a second communications band, such as Ka-band. Simultaneous operation in multiple bands can be implemented by configuring the satellite terminal to simultaneously provide one or more receive beams and one or more transmit beams, e.g., through a multiple-beam phased array antenna system. The transmit and/or receive beams also can be implemented such that they are independently pointable (steerable) and can have different bands of operation. Further, the phased array antenna system can be implemented to provide multiple electronically steerable beams without requiring mechanical movement.

Figure 1:
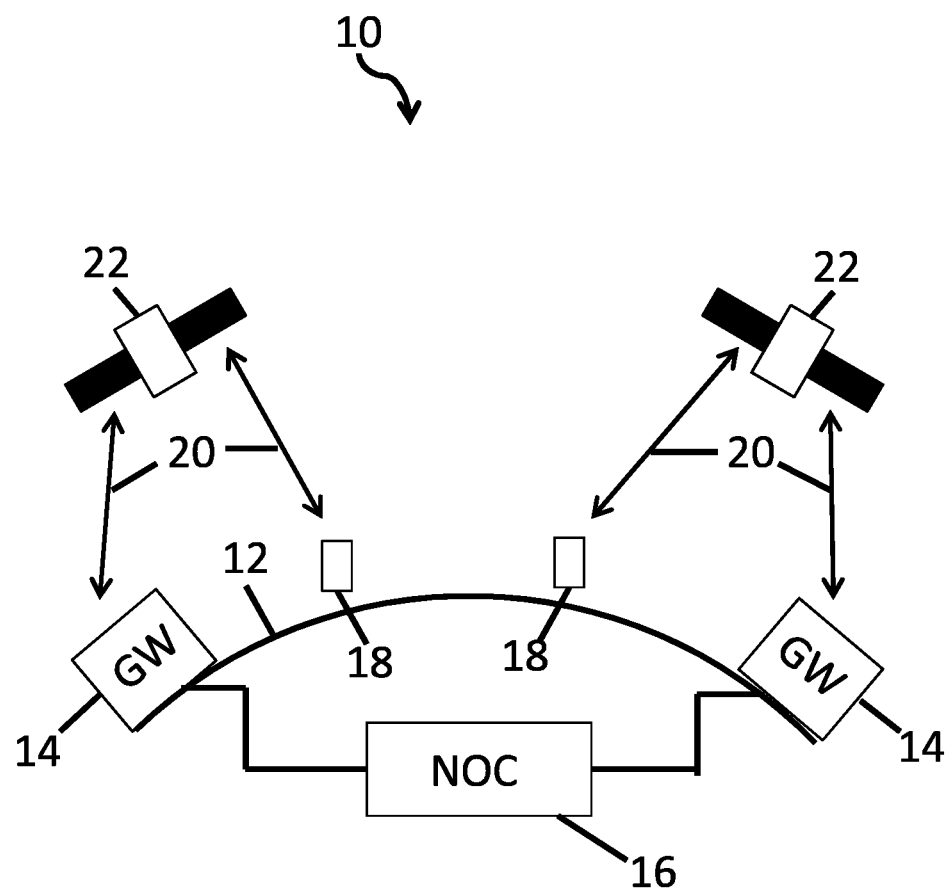
FIG. 1 presents a schematic diagram of an example of a communications system including satellites, in accordance with some embodiments.

An illustrative communications system with satellites is shown in FIG. 1. As shown in FIG. 1, communications system 10 may include one or more constellations of communications satellites 22. Satellites 22 may be placed in any/all of low earth orbit (LEO) (e.g., at altitudes of 500-1500 km or other suitable altitudes), geosynchronous orbit, and/or medium earth orbit (MEO) around the Earth 12. Satellites 22 may form a satellite constellation having one or more sets of satellites with different types of orbits, e.g., that are synchronized with each other to provide user populations (or geographic regions) with desired amounts of coverage. There may be any suitable number of satellites 22 in the satellite constellation(s) of communications system 10 (e.g., 10-100, 1,000-10,000, more than 100, more than 1000, fewer than 10,000, etc.).

Satellites 22 may deliver wireless services to equipment such as electronic devices 18. Electronic devices 18 may include handheld devices and/or other mobile devices, such as cellular telephones, tablet computers, laptop computers, wristwatches and other wearable devices, mobile terminals, drones, robots, and other portable electronic devices. Electronic devices 18 may also include stationary (or less portable) equipment, such as user satellite terminals (e.g., home base stations or office communication equipment) and/or associated equipment such as set-top boxes, routers, televisions, desktop computers, and other electronic equipment (sometimes referred to as user equipment, user terminals, user terminal equipment, etc.). Electronic devices 18 may be located anywhere on or above the Earth, e.g., on land, at sea, or in the air. The services provided by satellites 22 may include telephone (voice) service, broadband internet access, media distribution services such as satellite audio (satellite radio and/or streaming audio services) and satellite television (video), data communications, location, and/or other services.

System 10 may include one or more network operations centers (NOCs) such as NOC 16, which can be coupled to one or more gateways (GW), e.g., gateways 14 (sometimes referred to as ground stations). If desired, network operations can be managed using equipment at gateways 14, using equipment distributed throughout system 10, using multiple network operation centers 16 and/or other suitable equipment (e.g., servers or other control circuitry). The use of a network operations center such as NOC 16 of FIG. 1 is merely illustrative. In some configurations, clusters of gateways 14 and/or other equipment may share resources (e.g., gateways 14 in a metropolitan area may share a bank of modems located at one of the gateways 14 or other locations).

There may be any suitable number of gateways 14 in system 10 (e.g., 1-100, more than 10, more than 100, fewer than 1000, etc.). Gateways 14 may have transceivers that allow the gateways to transmit wireless signals to satellites 22 over wireless links 20 and that allow the gateways to receive wireless signals from satellites 22 over wireless links 20. Wireless links 20 may also be used to support communications between satellites 22 and electronic devices 18. During media distribution operations, for example, a gateway 14 may send traffic over an uplink (one of links 20) to a given satellite 22 that is then routed via a downlink (one of links 20) to one or more electronic devices 18. Gateways 14 may perform a variety of services, including supplying media for electronic devices 18, routing telephone calls (e.g., voice and/or video calls) between electronic devices 18 and/or other equipment, providing electronic devices 18 with internet access, and/or delivering other communications and/or data services to electronic devices 18. Gateways 14 may communicate with each other via satellites 22 and/or using ground-based communications networks.

NOC 16 may be used to manage the operations of one or more gateways 14 and/or the operations of one or more satellites 22. For example, NOC 16 may monitor network performance and take appropriate corrective actions if warranted. During these operations, NOC 16 may update software for one or more satellites 22 and/or electronic devices 18, may adjust satellite 22 altitude and/or other orbital parameters, may direct one or more satellites 22 to perform operations to adjust satellite solar panels and/or other satellite components, and/or may otherwise control and maintain one or more of the satellites 22 in the constellation of satellites orbiting the Earth 12. Further, in some embodiments, NOC 16 also may be configured to perform maintenance operations on one or more gateways 14.

Gateways 14, satellites 22, NOC 16, and electronic devices 18 may be configured to support encrypted communications. For example, NOC 16 and gateways 14 may communicate using encrypted communications. Similarly, gateways 14, satellites 22, and electronic devices 18 may communicate using encrypted communications. This allows NOC 16 to issue secure commands and to receive secure information when communicating with gateways 14, satellites 22, and/or electronic devices 18. The use of encrypted communications within system 10 also allows electronic devices 18 to securely communicate with each other and with gateways 14, and also allows gateways 14 to securely distribute media and/or other information to electronic devices 18, e.g., in compliance with digital protection requirements.

During operation of communications system 10, satellites 22 may serve as orbiting relay stations. For example, when a gateway 14 transmits a wireless uplink signal, one or more satellites 22 may forward these signals as downlink signals to one or more electronic devices 18. In some embodiments, some electronic devices 18 may be receive-only devices while other electronic devices 18 may support bidirectional communications with satellites. In scenarios in which an electronic device 18 supports bidirectional communications, an electronic device 18 may transmit wireless signals to one or more satellites 22, so that the one or more satellites 22 may relay this information to one or more appropriate destinations (e.g., gateways 14, other electronic devices 18, etc.).

Satellites 22 and links 20 may support any suitable satellite communications bands (e.g., IEEE bands), such as the L-band (1-2 GHZ), S-band (2-4 GHZ), C-band (4-8 GHz), Ka-band (27-40 GHz), V-band (40-75 GHz), W-band (75-110 GHz), and/or other bands suitable for space communications (e.g., frequencies above 1 GHz, below 110 GHz, and/or other suitable frequencies).

Some frequencies (e.g., C-band frequencies and other low frequencies such as L-band and S-band frequencies) may penetrate buildings and may therefore be suitable for communicating with electronic devices located indoors at least some of the time, e.g., handheld electronic devices 18 (e.g., devices that are mobile and that may sometimes be indoors and may sometimes be outdoors) and/or electronic devices 18 without an external antenna/receiver. Other frequencies (e.g., V-band frequencies and other high frequencies such as Ka-band and W-band frequencies) do not readily (or effectively) penetrate buildings and may therefore be suitable for communicating with electronic devices 18 that have an external antenna/receiver or that are located outdoors and/or otherwise have a line-of-sight path to satellites 22. A satellite terminal, e.g., an electronic device 18, that includes an external portion can be configured to receive signals in any of one or more frequency bands and to relay the received signals to a corresponding indoor portion. Further, the outdoor portion of a satellite terminal, e.g., an electronic device 18, can be configured to transmit signals in any of one or more frequency bands, including converting between frequencies for reception and/or transmission. To accommodate a variety of scenarios, e.g., both mobile device scenarios and home/office scenarios, satellites 22 may, for example, include C-band satellites (or other low band satellites such as L-band or S-band satellites), V-band satellites (or other high band satellites such as Ka-band or W-band satellites) and/or dual-band satellites (e.g., satellites that that support C-band and V-band communications or other low and high band communications).

Figure 2:
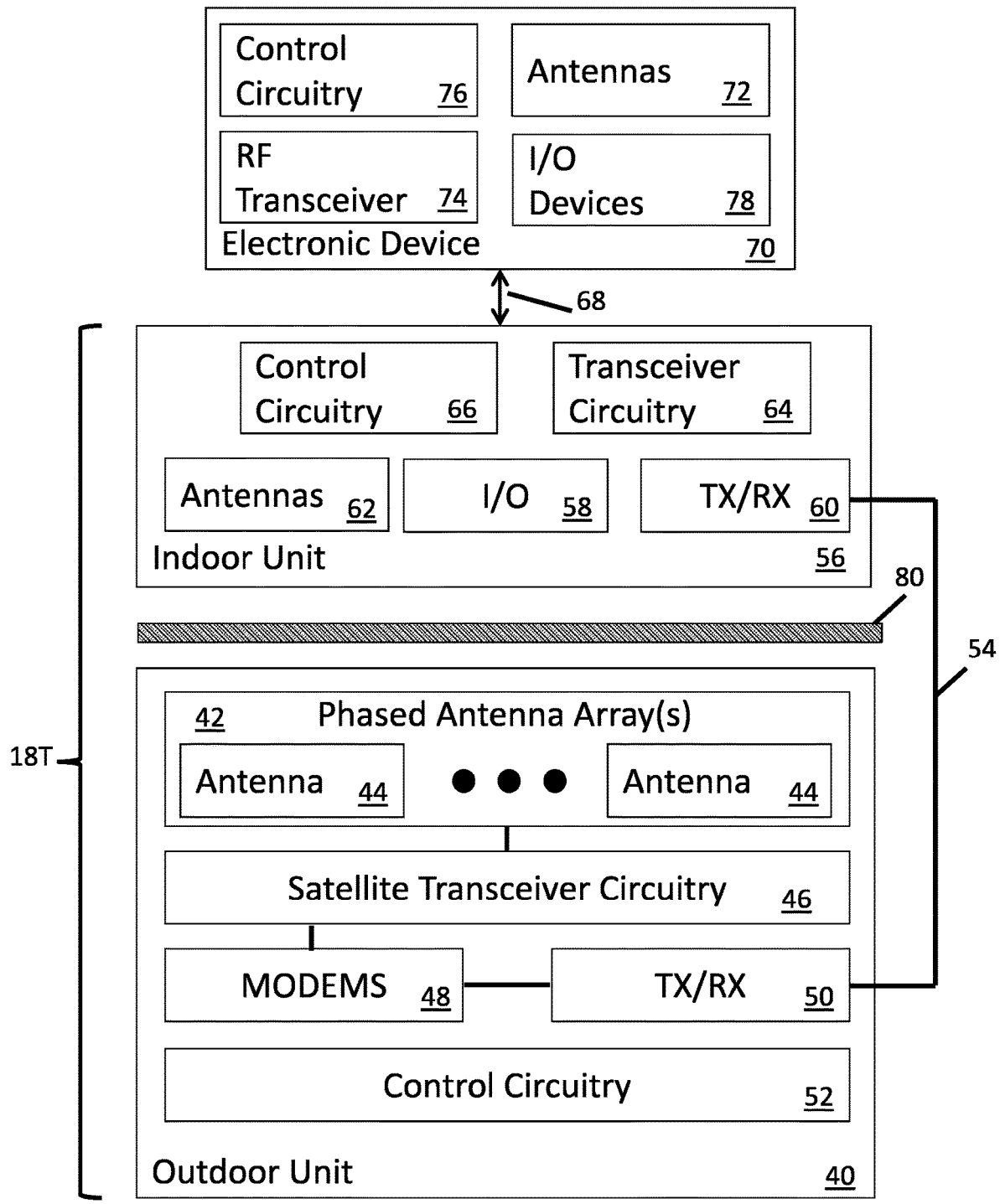
FIG. 2 presents a schematic diagram of an example of a satellite terminal having linked indoor and outdoor units in communication with an electronic device, in accordance with some embodiments.

FIG. 2 presents a schematic diagram of an illustrative satellite terminal for a home, office, or other location. Satellite terminal 18T, which may sometimes be referred to as satellite terminal equipment, a satellite receiver, or user satellite equipment, etc. may serve as one of devices 18 of FIG. 1. As shown in FIG. 2, terminal 18T may have multiple units such as unit 40 and unit 56, which are linked by a communications path such as path 54. Unit 40 may be an outdoor unit with a weatherized housing suitable for mounting on a roof or other outdoor location. Unit 56 may be an indoor unit (e.g., an unweatherized unit suitable for installation indoors). Communications path 54 may be formed from coaxial cable, Ethernet cable, optical fiber cable, other types of cabling, a wireless link, or other communications path. Configurations in which path 54 is a wired path such as a cable may sometimes be described herein as an example.

Unit 40 may have communications circuitry such as communications circuit 50 (e.g., a transceiver with a transmitter for transmitting signals to unit 56 over path 54 and a receiver for receiving signals from unit 56 over path 54). Unit 56 may have corresponding communications circuitry such as communications circuit 60 (e.g., a transceiver with a transmitter for transmitting signals to unit 40 over path 54 and a receiver for receiving signals from unit 40 over path 54). The communications between units 40 and 56 may be bidirectional communications involving analog signals (e.g., radio-frequency signals) and/or digital data. For example, communications circuits 50 and 60 may support bidirectional digital communications and may communicate digitally (e.g., transmitting and receiving digital data packets) over path 54 at data rates of at least 100 Mbps, at least 500 Mbps, at least 1 Gbps, less than 100 Gbps, or other suitable data rate. Communications circuitry such as circuitry 50 may serve as a packet fabric for unit 40 that aggregates service flows and queues them into a common interface to be sent to unit 56 while allowing unit 40 to support make-before-break satellite communications handover functionality (e.g., for sensitive data streams).

If desired, unit 56 may have a power adapter such as an alternating-current-to-direct-current power adapter that supplies direct-current power to unit 40 (e.g., over path 54 or a separate power path). Alternating-current power may also be supplied to unit 40 from unit 56 (e.g., in addition to or instead of supplying unit 40 with direct-current power). Unit 56 may have a power cord that plugs into a source of power such as an alternating-current wall outlet (e.g., mains power). Configurations may also be used in which unit 40 has a power cord (e.g., a cord that plugs into an outdoor source of power).

As shown in FIG. 2, unit 40 may have one or more phased antenna arrays 42 formed from antennas 44. Phased antenna arrays 42 may include adjustable circuitry such as adjustable phase delay circuits and/or adjustable gain circuits (e.g., circuits for selectively adjusting signal phase and amplitude for incoming and/or outgoing signals for each antenna 44 and thereby steering phased antenna array beams). There may be any suitable number of phased antenna arrays 42 in unit 40 (e.g., at least two, at least three, at least four, fewer than 10, etc.). In some configurations, antennas 44 may be shared between multiple phased antenna arrays. For example, some or all of antennas 44 may be used in forming a first phased antenna array (e.g., an antenna array used in steering a first antenna beam towards a first satellite) while some or all of these same antennas 44 are used in forming a second phased antenna array (e.g., an antenna array used in steering a second antenna beam towards a second satellite). Configurations in which phased antenna arrays 42 include arrays of separate antennas 44 may also be used. For example, unit 40 may have a first phased antenna array formed from a first set of antennas 44 and may have a second phased antenna array formed from a second set of different antennas 44. Configurations for unit 40 with three or four or more phased antenna arrays 42 may also be formed from either overlapping sets of antennas 44 or separate sets of antennas 44. In some implementations, antennas 44 in phased antenna arrays 42 may all be of one type, while in some other implementations, two or more different types of antennas 44 can be included in phased antenna arrays 42.

The antenna beams (signal beams) that are formed by phased antenna arrays 42 may be used for transmitting signals and/or receiving signals, and may all be pointed at the same satellite 22 and/or may be pointed at different satellites. For example, signals may be received using a beam pointed at one satellite while signals are being transmitted using another beam (e.g., a beam pointed at the same satellite or another satellite). During operation, phased antenna arrays 42 may be steered to track multiple satellites 22 (e.g., non-geostationary satellites) as they traverse different orbits.

Antennas 44 in phased antenna arrays 42 may include any/all of monopoles, dipoles, and/or other types of antenna elements. Antennas 44 may, for example, include any/all of loop antennas, helical antennas, patch antennas, inverted-F antennas, Yagi antennas, slot antennas, horn antennas, cavity antennas, dish antennas, or other suitable antennas. Antennas 44 and phased antenna arrays 42 may be configured to handle any suitable types of satellite communications. For example, antenna arrays 42 may handle satellite communications in bands such as any/all of the L-band (1-2 GHZ), S-band (2-4 GHZ), C-band (4-8 GHZ), Ka-band (27-40 GHz), V-band (40-75 GHZ), W-band (75-110 GHZ), and/or other bands suitable for space communications (e.g., frequencies above 1 GHz, below 110 GHz, and/or other suitable frequencies). Satellite transceiver circuitry 46 may include multiple satellite transmitters and/or receivers, and may also be configured to operate in satellite communications using bands such as any/all of the L-band (1-2 GHZ), S-band (2-4 GHZ), C-band (4-8 GHZ), Ka-band (27-40 GHz), V-band (40-75 GHZ), W-band (75-110 GHZ), and/or other bands suitable for space communications (e.g., frequencies above 1 GHz, below 110 GHz, and/or other suitable frequencies). If desired, antennas 44 and transceiver circuitry 46 may be configured to receive beacon signals (e.g., beacons with time/frequency reference information, ephemeris information to aid in beam steering towards desired satellites, etc.). During operation, modems 48 may receive digital data to be transmitted from circuit 50 and may provide corresponding outgoing data signals to satellite transceiver circuitry 46 and phased antenna arrays 42 for transmission to one or more satellites. When satellite signals are received from antenna arrays 42 and satellite transceiver circuitry 46, modems 48 may produce digital data from these received signals that is transmitted to indoor unit 56 by circuit 50.

Modems 48 may provide sufficient modem capacity to handle multiple (e.g., simultaneous or overlapping) communications sessions. For example, modems 48 may be configured to use transceiver circuitry 46 and phased antenna arrays 42 to simultaneously receive multiple media streams such as two or more, three or more, or four or more broadcast television channels from one or more satellites, to handle make-before-break handover procedures when transitioning terminal 18T between an outgoing satellite and an incoming satellite (e.g., dynamic handover procedures to maintain constant service), to handle simultaneous television sessions and voice/internet sessions, to handle one or more voice calls and/or one or more internet sessions while simultaneously receiving multiple broadcast television streams, to receive data while transmitting data, etc. Communications circuitry 50 may supply incoming signals from satellite transceiver circuitry 46 to communications circuitry 60 over path 54 (e.g., as digital data) and may provide signals received from communications circuitry 60 (e.g., digital data) to circuitry 46.

Outdoor unit 40 may include control circuitry 52 and indoor unit 56 may include control circuitry 66. Control circuitry 52 and 66 may include storage, such as any/all of solid-state drives, random-access memory, and/or hard disk drives and other volatile and/or nonvolatile memory. Control circuitry 52 and 66 may also include one or more microcontrollers, microprocessors, digital signal processors, communications circuits with processors, application specific integrated circuits, programmable logic devices, field programmable gate arrays, and/or other processing circuitry. During operation, control circuitry 52 and 66 may run code (instructions) from storage in control circuitry 52 and/or 66 to implement desired functions for outdoor unit 40 and/or indoor unit 56. For example, control circuitry in terminal 18T may control operations such as tuning operations (e.g., for channel selection), controlling of the modulation and demodulation operations of modems 48, antenna beam steering using phased antenna arrays 42, controlling of over-the-air signaling protocols for network access and terminal management, etc. Control circuitry in terminal 18T may be used in processing user commands from coupled (communicatively) user equipment that communicates with unit 56 (see, e.g., electronic device 70) and/or may be used in performing other control operations for terminal 18T. As an example, control circuitry 66 may be configured to perform operations such as network (packet) routing functions (e.g., so that indoor unit 56 may serve as a network router), may perform firewall operations (e.g., to enhance internet access security by allowing indoor unit 56 to serve as a firewall), may be configured to use transceiver circuitry 64 and antennas 62 to form a wireless access point (e.g., a WiFi® access point), and/or may be used to store media (e.g., so that indoor unit 56 serves as a digital video recorder or media server that allows a user to record media (e.g., television programs), to store downloaded media for future playback, etc.).

Indoor unit 56 may include optional input/output devices such as I/O devices 58. Devices 58 may include any/all of buttons, voice control devices, touch screens, and other devices for obtaining user input (e.g., user input to perform power on/off functions, user input for adjusting settings for terminal 18T, etc.). If desired, devices 58 may include output devices (e.g., status indicator lights, displays, speakers, etc.). Control circuitry 66 may use input from devices 58 (e.g., user input) to make adjustments to the settings of terminal 18T and may supply a user with output (e.g., illumination from status indicator lights, etc.) using I/O devices 58. Input-output devices such as these may also be included in outdoor unit 40 (e.g., for set-up operations, to support maintenance, etc.).

Indoor unit 56 may include antennas 62 (e.g., antenna arrays, one or more individual antennas, etc.). Antennas 62 may include any/all of loop antennas, helical antennas, patch antennas, inverted-F antennas, Yagi antennas, slot antennas, horn antennas, cavity antennas, dish antennas, arrays of antennas (e.g., a phased antenna array that supports beam steering operations), or other suitable antennas. Control circuitry 66 may use radio-frequency transceiver circuitry 64 and antenna(s) 62 to support wireless communications with user equipment, such as electronic device 70 over communications link 68. These communications may be, for example, wireless local area network communications (e.g., WiFi®) at 2.4 GHz, 5 GHz, 60 GHz, and/or other wireless communications bands (e.g., antennas 62 and transceiver 64 may be used in forming a wireless access point). Communications circuitry in indoor unit 56 may also be used in forming wired communications paths with user devices such as electronic device 70 (e.g., via Ethernet cable, coaxial cable, etc.). Configurations in which link 68 is a wireless link rather than a wired link are illustrative.

One or more pieces of electronic equipment (e.g., indoors equipment), such as electronic device 70, may communicate with indoor unit 56 over one or more links, such as link 68. Electronic device 70 may be, for example, a tablet computer, cellular telephone, laptop computer, desktop computer, television, set-top box, internet-connected voice-controlled speaker, wristwatch, gaming unit, wearable device, and/or other user equipment. Device 70 may include antennas 72 and wireless transceiver circuitry 74 for supporting communications with antennas 62 and transceiver circuitry 64 of indoor unit 56, e.g., over link 68. Control circuitry 76 (e.g., circuitry such as circuitry 52 and/or 66) may be used in controlling the operation of electronic device 70. During operation, for example control circuitry 76 may use input-output devices 78 (e.g., buttons, touch pads, touch screens, microphones, and/or other input devices) for gathering input from a user (e.g., channel change commands, media selection commands, volume adjustment commands, etc.) and may provide corresponding control commands to either or both of units 56 and 40 via link 68 and/or link 54. Control circuitry 76 may also receive information from units 40 and/or 56 (e.g., via antennas 72 and transceiver 74), and may use this information in supplying a user at electronic device 70 with output (e.g., by displaying video on a display in devices 78, by playing audio through a speaker in devices 78, and/or by otherwise supplying a user with voice call information, internet browsing information, television content, and/or other content such as video, audio, text, graphics, etc.).

Terminal 18T may provide a user of device 70 with broadband internet access (voice, data, etc.) and the ability to receive video broadcasts and other media. Terminal 18T may form communications links with satellites 22 over satellite links 20. If desired, terminal 18T may communicate simultaneously with two or more of satellites 22 (e.g., non-geostationary satellites such inclined geosynchronous satellites and low-earth satellites operating in different orbits, at different orbital altitudes, and/or at different frequency bands) while simultaneously transmitting and receiving. As one example, terminal 18T may support V-band transmit and receive terminal functions for two-way broadband satellite internet service and Ka-band receive terminal functions for broadcast media and media data caching. Terminal 18T may support voice traffic, television traffic, media-on-demand traffic, and/or other suitable traffic.

One or more integrated circuits may be used in forming the circuitry of unit 40. For example, unit 40 may include highly integrated, multi-channel DVB-S2X (Digital Video Broadcast—Satellite, 2nd generation w/Extensions) transmit and DVB-RCS2 (DVB—Return Channel via Satellite 2nd Generation) receive integrated circuits and flexible, fast-frequency-tuning radio-frequency integrated circuits. This may help reduce the cost and/or size of terminal 18T.

Phased antenna arrays 42 may be electrically adjusted for beam steering in accordance with control signals from control circuitry 52 without use of any moving mechanical parts. Multiple bands may be serviced simultaneously (e.g., to allow simultaneous use of V-band and Ka-band satellite constellations). The beam steering operations of phased antenna arrays 42 may allow terminal 18T to simultaneously use two or more satellites that do not maintain a constant positional separation to each other or to any absolute fixed beam pointing direction. Transmit and receive beams may be pointed independently during operation. Modem digital signal and radio-frequency signal processing operations may be performed in outdoor unit 40 to support operations such as tuning, channel selection, modulation, and demodulation functions at a location that is local to phased antenna arrays 42. This allows radio-frequency-to-intermediate frequency signal interfaces to be isolated in unit 40. Link 54 may, if desired, handle exclusively digital data (e.g., data with a data rate of 1 Gbps, at least 100 Mbps, at least 500 Mbps, at least 1 Gbps, less than 10 Gbps, less than 25 Gbps, 500 Mbps-10 Gbps, 100 Mbps to 10 Gbps, etc.).

The two units (outdoor unit 40 and indoor unit 56) into which terminal 18T is partitioned work together to translate interaction with the constellation of satellites 22 into suitable consumer access media at indoor unit 56 (e.g. Ethernet, WiFi, etc.), thereby allowing terminal 18T to provide services to a large variety of consumer appliances (e.g. computers, gaming units, set-top boxes and/or other media units, cellular telephone equipment, televisions, tablets, etc.). During operation, unit 40 interacts with satellites 22 using antennas 44 of phased antenna arrays 42, radio-frequency/analog signal processing in circuitry 46, and modems 48, as well as back-end packet processing circuitry, such as communications circuitry 50, so that unit 56 can serve as a communications gateway for a user's home. Indoor unit 56 interfaces to outdoor unit 40 using communications link 54 and can provide standardized IP network access services to the device 70 such as firewall, network address translation, routing, and local area network services (e.g., over Ethernet and WiFi®). Unit 56 may also provide power for unit 40. Further, indoor unit 56 can be separated from outdoor unit 40 by a barrier 80, such as a window, wall, or other barrier (e.g., a transparent, semitransparent, or opaque structure).

The use of units 40 and 56 in implementing terminal 18T allows signal processing and modem operations to be performed outdoors adjacent to phased antenna arrays 42, while simplifying the hardware of unit 56 and reducing bandwidth requirements for path 68.

Figure 3:
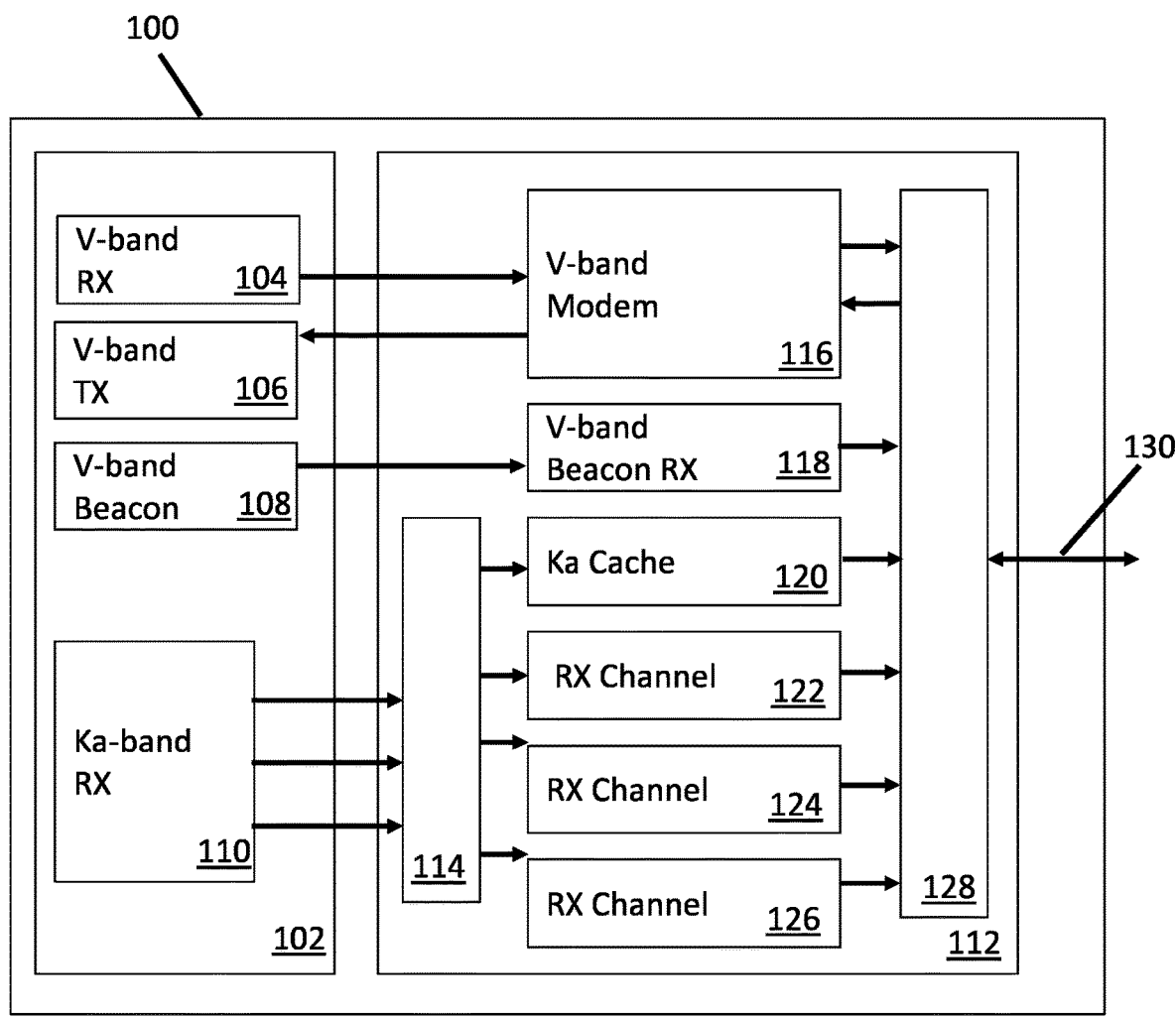
FIG. 3 presents a schematic diagram of an example consolidated outdoor unit for use in a satellite terminal, in accordance with some embodiments.

FIG. 3 presents a schematic diagram of an example consolidated outdoor unit for use in a satellite terminal, in accordance with some embodiments. The consolidated outdoor unit 100 can work together with a corresponding indoor unit to translate communications to/from an associated satellite constellation (or satellite communications network), e.g., into one or more satellite bands and/or into standard terrestrial communications protocols, such as Ethernet, WiFi, consumable media, etc. Consolidated outdoor unit 100 can incorporate components and functionality to communicate with one or more satellites, including any/all of antennas, RF analog signal processing components, digital signal processing components, modems, filters, amplifiers, and other such components, to serve as a single, integrated communications gateway.

Consolidated outdoor unit 100 can include a multi-frequency, multi-beam antenna system 102, such as a phased-array antenna system, that can provide for simultaneous communication with multiple satellites, including satellites in different orbits and/or communicating using different bands. The multi-frequency, multi-beam antenna system 102 provides independent access to multiple satellites (including non-geostationary satellites) and can track the multiple satellites as they traverse different orbits. In some implementations, multi-frequency, multi-beam antenna system 102 can include a V-band receive sub-array 104, a V-band transmit sub-array 106, a V-band beacon antenna 108 (e.g., one or more patch antennas), and a Ka-beam receive sub-array 110. In some other implementations, more, fewer, or different components can be incorporated, including components that operate in different satellite bands, such as any/all the L-band (1-2 GHZ), S-band (2-4 GHZ), C-band (4-8 GHZ), Ka-band (27-40 GHz), V-band (40-75 GHZ), W-band (75-110 GHz), and/or other bands suitable for space communications (e.g., frequencies above 1 GHz, below 110 GHz, and/or other suitable frequencies).

Consolidated outdoor unit 100 also can include a multi-channel modem system 112, which can include modems configured to support a variety of protocols and communications bands, including any/all satellite bands supported by multi-frequency, multi-beam antenna system 102. Multi-channel modem system 112 can support dynamic handover between satellites in order to maintain continuous, uninterrupted service and can include processor electronics to control over the air signaling protocols, e.g., required for network access and terminal management. For example, multi-channel modem system 112 can include a V-band modem 116, a V-band beacon receiver 118, a Ka-band channel beam selector 114 for selecting one or more Ka-band channels, a Ka-band cache 120 for caching received Ka-band content, and receive channels 122, 124, and 126. In some other implementations, more, fewer, or different components can be incorporated, including components that operate in different satellite bands. Additionally, multi-channel modem system 112 can include a packet fabric 128, that can aggregate multiple service flows and queue them into a common interface that can be communicated to the corresponding indoor unit of the satellite terminal, e.g., over a wired or wireless connection, such as a coax connection.

Figure 4:
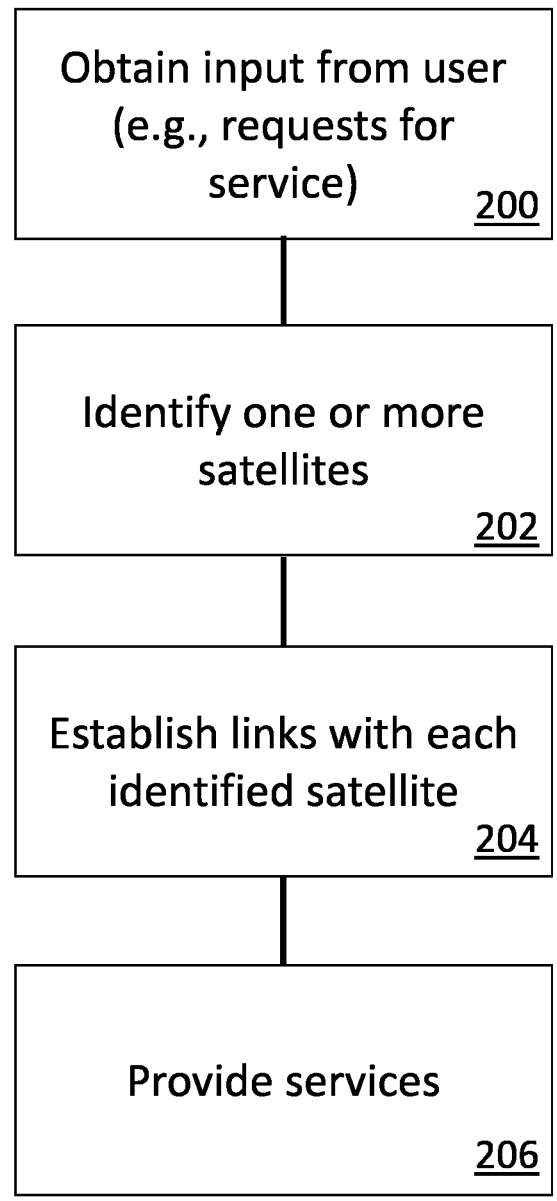
FIG. 4 is a flow chart of illustrative operations involved in communicating between a satellite terminal and satellites in accordance with some embodiments.

FIG. 4 is a flow chart of illustrative operations involved in using communications system 10 to provide services.

During the operations of block 200, a user may supply input to input-output devices 78 specifying services of interest. A user may, for example, identify a television channel of interest, identify media files of interest for downloading and/or streaming, initiate a voice telephone call, send an email message, and/or request other services from system 10 by providing appropriate input to system 10 (e.g., device 70 and/or unit 56). The user input may include voice commands, text input with a keyboard, touch sensor input, remote control button press input, and/or other input specifying media services, television services, voice and/or video telephone call services, text messaging services, email services, and/or other broadband services available through system 10.

Based on the user input that is gathered during the operations of block 200, satellites in system 10 that are to be used in providing the desired services may be identified by terminal 18T and/or other equipment in system 10 during the operations of block 202. After appropriate satellites 22 for delivering the desired services to the user have been identified, system 10 may establish communications links between terminal 18T and each of the identified satellites (block 204).

During the operations of block 206, the services requested with the user input that was provided during block 200 may be provided to the user from each of the multiple identified satellites. For example, television services may be provided, streaming media content may be provided, emails may be delivered, telephone calls may be carried by system 10, and/or other services may be provided for the user.

In accordance with an embodiment, a satellite terminal configured to communicate wirelessly with a satellite constellation is provided that includes an outdoor unit having, a phased antenna array, and satellite transceiver circuitry coupled to the phased antenna array, and an indoor unit communicatively coupled to the outdoor unit over a communications path, the indoor unit has antennas and transceiver circuitry configured to form a wireless access point.

In accordance with another embodiment, the indoor unit further includes a first communications circuit coupled to the communications path, the outdoor unit includes a second communications circuit coupled to the communications path that is configured to digitally communicate with the first communications circuit over the communications path, and the first communications circuit is configured to receive digital data from the second communications circuit that includes including digital data corresponding to streaming media received by the phased antenna array.

In accordance with another embodiment, the outdoor unit includes an additional phased antenna array and includes control circuitry, the control circuitry is configured to steer a first beam towards a first satellite in the satellite constellation with the phased antenna array and is configured to simultaneously steer a second beam towards a second satellite in the satellite constellation with the additional phased antenna array.

In accordance with another embodiment, the outdoor unit further includes modems coupled between the satellite transceiver circuitry and the first communications circuit and the modems are configured to transmit data over the first beam while receiving data over the second beam.

In accordance with another embodiment, the phased antenna array is configured to receive V-band satellite signals and the additional phased antenna array is configured to receive V-band satellite signals.

In accordance with another embodiment, the phased antenna array is configured to receive V-band satellite signals and the additional phased antenna array is configured to receive Ka-band satellite signals.

In accordance with another embodiment, the phased antenna array is configured to receive Ka-band satellite signals, the additional phased antenna array is configured to receive Ka-band satellite signals, and the first and second communications circuits are configured to operate at a data rate between 100 Mbps and 10 Gbps.

In accordance with another embodiment, the satellite transceiver circuitry is configured to receive V-band satellite signals.

In accordance with another embodiment, the satellite transceiver circuitry is configured to receive Ka-band satellite signals.

In accordance with another embodiment, the satellite transceiver circuitry is configured to transmit and receive V-band signals and to receive Ka-band satellite signals.

In accordance with an embodiment, an outdoor unit configured to be coupled by a communications path to an indoor unit to form a satellite terminal that communicates wirelessly with a satellite constellation is provided that includes phased antenna array circuitry including separately steerable first and second phased antenna arrays, satellite transceiver circuitry coupled to the first and second phased antenna arrays, modems coupled to the satellite transceiver circuitry and configured to transmit data to the satellite constellation using the satellite transceiver circuitry and the phased antenna array circuitry and configured to receive data from the satellite constellation using the satellite transceiver circuitry and the phased antenna array circuitry, control circuitry configured to control the phased antenna array circuitry, and a communications circuit that is coupled between the modems and the communications path and that is configured to transmit digital data packets to the indoor unit over the communications path.

In accordance with another embodiment, the satellite transceiver circuitry is configured to receive V-band satellite signals from the first phased antenna array and is configured to receive non-V-band satellite signals from the second phased antenna array.

In accordance with another embodiment, the modem is configured to transmit signals using the satellite transceiver circuitry and the first phased antenna array while simultaneously receiving signals using the satellite transceiver circuitry and the second phased antenna array.

In accordance with another embodiment, the satellite transceiver circuitry is configured to receive V-band satellite signals using the phased antenna array circuitry.

In accordance with another embodiment, the control circuitry is configured to steer the first phased antenna array to point at a first satellite in the satellite constellation while simultaneously steering the second phased antenna array to point at a second satellite in the satellite constellation.

In accordance with another embodiment, the first phased antenna array is configured to receive Ka-band satellite signals and the second phased antenna array is configured to receive Ka-band satellite signals.

In accordance with an embodiment, a satellite terminal is provided that includes a first unit having phased antenna array circuitry and satellite transceiver circuitry coupled to the phased antenna array circuitry, and a second unit configured to couple to the first unit with a cable, the first and second units have first and second respective digital communications circuits that are configured to communicate with each other over the cable using digital data packets.

In accordance with another embodiment, the phased antenna array circuitry includes multiple phased antenna arrays.

In accordance with another embodiment, the satellite transceiver circuitry is configured to receive V-band satellite signals.

In accordance with another embodiment, the first unit is an outdoors unit, the second unit is an indoors unit, the satellite transceiver circuitry is configured to receive Ka-band satellite signals, and the second unit has an antenna and wireless local area network transceiver circuitry coupled to the antenna.

The foregoing is merely illustrative and various modifications can be made to the described embodiments. The foregoing embodiments may be implemented individually or in any combination.

What is claimed is:

1. A satellite terminal configured to communicate wirelessly with a satellite constellation, the satellite terminal comprising:
    a phased antenna array;
    a first antenna that is separate from the phased antenna array;
    a wired communications path;
    a receiver that is communicatively coupled to the first antenna;
    a packet fabric that communicatively couples the receiver and the phased antenna array to the wired communications path;
    a second antenna; and
    a modem that is separate from the receiver and that is communicatively coupled to the second antenna, wherein the packet fabric communicatively couples the modem to the wired communications path.

2. The satellite terminal of claim 1, wherein the receiver is not communicatively coupled to the phased antenna array.

3. The satellite terminal of claim 1, wherein the phased antenna array comprises at least two patch antenna elements.

4. The satellite terminal of claim 1, further comprising:
    a router, wherein the wired communications path couples the router to the packet fabric.

5. The satellite terminal of claim 4, wherein the packet fabric is configured to aggregate multiple service flows for the wired communications path.

6. The satellite terminal of claim 1, further comprising:
    a cache, wherein the cache and a channel are coupled in parallel between the phased antenna array and the packet fabric.

7. The satellite terminal of claim 6, further comprising:
    a beam selector that communicatively couples the cache and the channel to the phased antenna array, wherein the cache and the channel are coupled in parallel between the beam selector and the packet fabric.

8. The satellite terminal of claim 7, further comprising:
    an additional channel coupled in parallel with the cache and the channel between the beam selector and the packet fabric.

9. The satellite terminal of claim 7, wherein the beam selector is configured to selectively communicatively couple the phased antenna array to a selected one of the cache or the channel.

10. The satellite terminal of claim 1, further comprising:
    a channel communicatively coupled to the phased antenna array, wherein
    the receiver is separate from the channel,
    the modem is separate from the channel, and
    the packet fabric communicatively couples the channel to the wired communications path.

11. A satellite terminal configured to communicate wirelessly with a satellite constellation, the satellite terminal comprising:
    a phased antenna array;
    a channel;
    a beam selector communicatively coupled between the channel and the phased antenna array; and
    a cache communicatively coupled to the beam selector in parallel with the channel, wherein the beam selector is configured to selectively communicatively couple the phased antenna array to a selected one of the channel or the cache.

12. The satellite terminal of claim 11, further comprising:
    a communications path; and
    a packet fabric that communicatively couples the cache and the channel to the communications path, wherein the packet fabric is configured to aggregate multiple service flows for the communications path.

13. The satellite terminal of claim 11, further comprising:
    an additional phased antenna array communicatively coupled to the packet fabric.

14. The satellite terminal of claim 13, wherein the beam selector communicatively couples the phased antenna array but not the additional phased antenna array to the packet fabric.

15. The satellite terminal of claim 13, further comprising:
    a modem communicatively coupled between the additional phased antenna array and the packet fabric.

16. The satellite terminal of claim 15, further comprising:
    a beacon antenna; and
    a receiver communicatively coupled between the beacon antenna and the packet fabric.

17. The satellite terminal of claim 11, further comprising:
    an additional channel coupled to the beam selector in parallel with the channel and the cache, wherein the beam selector is configured to selectively communicatively couple the phased antenna array to a selected one of the channel, the additional channel, or the cache.

18. A satellite terminal configured to communicate wirelessly with a satellite constellation, the satellite terminal comprising:
    a phased antenna array;
    a first channel;
    a cache;
    a beam selector communicatively coupled to the phased antenna array; and
    a packet fabric, wherein the first channel and the cache are coupled in parallel between the beam selector and the packet fabric.

19. The satellite terminal of claim 18, further comprising a second channel, wherein the second channel is coupled in parallel with the first channel and the cache between the beam selector and the packet fabric.

20. The satellite terminal of claim 18, further comprising:
    a communications path coupled to the packet fabric, wherein the packet fabric is configured to aggregate multiple service flows for the communications path.

* * * * *